United States Patent [19]

Barberan Albiac

[11] Patent Number: 5,616,211
[45] Date of Patent: Apr. 1, 1997

[54] VENEERED PANEL CONTINUOUS LAMINATION MACHINE

[75] Inventor: Jesús Barberan Albiac, Barcelona, Spain

[73] Assignee: Barberan, S.A., Barcelona, Spain

[21] Appl. No.: 419,981

[22] Filed: Apr. 11, 1995

[51] Int. Cl.$^6$ ............................ B32B 31/04; B31F 5/00
[52] U.S. Cl. ..................... 156/552; 156/557; 156/379.6; 156/379.8
[58] Field of Search .................... 156/555, 557, 156/578, 499, 379.6, 379.8, 543, 552, 564

[56] References Cited

U.S. PATENT DOCUMENTS

| | | | |
|---|---|---|---|
| 3,599,968 | 8/1971 | Billett | 156/557 |
| 3,616,090 | 10/1971 | Larson | 156/559 |
| 4,351,379 | 9/1982 | Hasegawa | 144/356 |
| 4,414,050 | 11/1983 | Bernath | 156/166 |
| 4,466,856 | 8/1984 | Paakki | 156/558 |
| 4,797,169 | 1/1989 | Aizawa et al. | 156/64 |
| 4,997,514 | 3/1991 | Bielfeldt | 156/558 |
| 5,234,519 | 8/1993 | Talbot et al. | 156/212 |
| 5,415,943 | 5/1995 | Groger et al. | 428/537.1 |

*Primary Examiner*—Nina Bhat
*Attorney, Agent, or Firm*—Gary M. Nath, Esq.; Nath & Associates; Richard E. Campbell

[57] ABSTRACT

Veneered panel continuous lamination machine. It consists of a machine formed by two modules (4) and (5) arranged consecutively, the first of which applies veneer (2) to the lower surface of the panels (1), the veneer (2) being supplied by an unwinding device (11); whereas module (5) applies a veneer (3) to the upper surface of the panels (1); this veneer (3) is supplied in cut sheets from a bin (22) where they are stacked.

10 Claims, 3 Drawing Sheets with respect to the two possible uses of high-pressure or low-pressure veneer for lamination.

VENEERED PANEL CONTINUOUS LAMINATION MACHINE

The furniture manufacturing industry and those industries dedicated to decor, use a large variety of particle board panels covered with a high or low-pressure decorative laminate, normally supplied in individual sheets or rolled on a spool and known as decorative veneer.

Gluing the decorative veneer to the panels is currently carried out by a discontinuous process. For this purpose, the panels are inserted into a gluing machine, in which a PVAc adhesive is applied to one or both sides. The panel, impregnated with adhesive, is placed on the bottom veneer and is then covered with the top veneer. Next, it is inserted into a press and the hot plates are closed onto it, remaining closed for whatever time is necessary to assure good adherence. Once this time has elapsed, the press is opened again to remove the laminated panels and begin a new cycle.

This entail slow and expensive process, which results in an unfavorable elevation in the cost of the products, due to the slow production rate and the amount of labor needed.

In order to solve this problem, in accordance with the purpose of the invention, a machine is proposed which is designed to carry out the operation described above by a continuous and completely automatic process of laminating particle board panels with an artificial decorative veneer.

The machine, which is the object of the invention, consists basically of a set of two consecutive operating modules designed to fix the veneer respectively on the lower and upper surfaces of the base panels. Each of these modules includes its respective feeder of the veneer to be adhered and a panel transportation mechanism for moving the panels the length of the line. The needed applicators have been placed in each part to supply the fixation adhesives.

In this way, a simple and practical process has been achieved which makes it possible to completely carry out lamination of the upper and lower surfaces of the particle board panels and give them the desired appearance in a completely automated and uninterrupted mode. Furthermore, this process may be carried out in a continuous fashion on successive panels, allowing for a high production rate, which together with minimum labor requirements, makes the process highly profitable with the advantage of product cost reduction.

Figure 1:
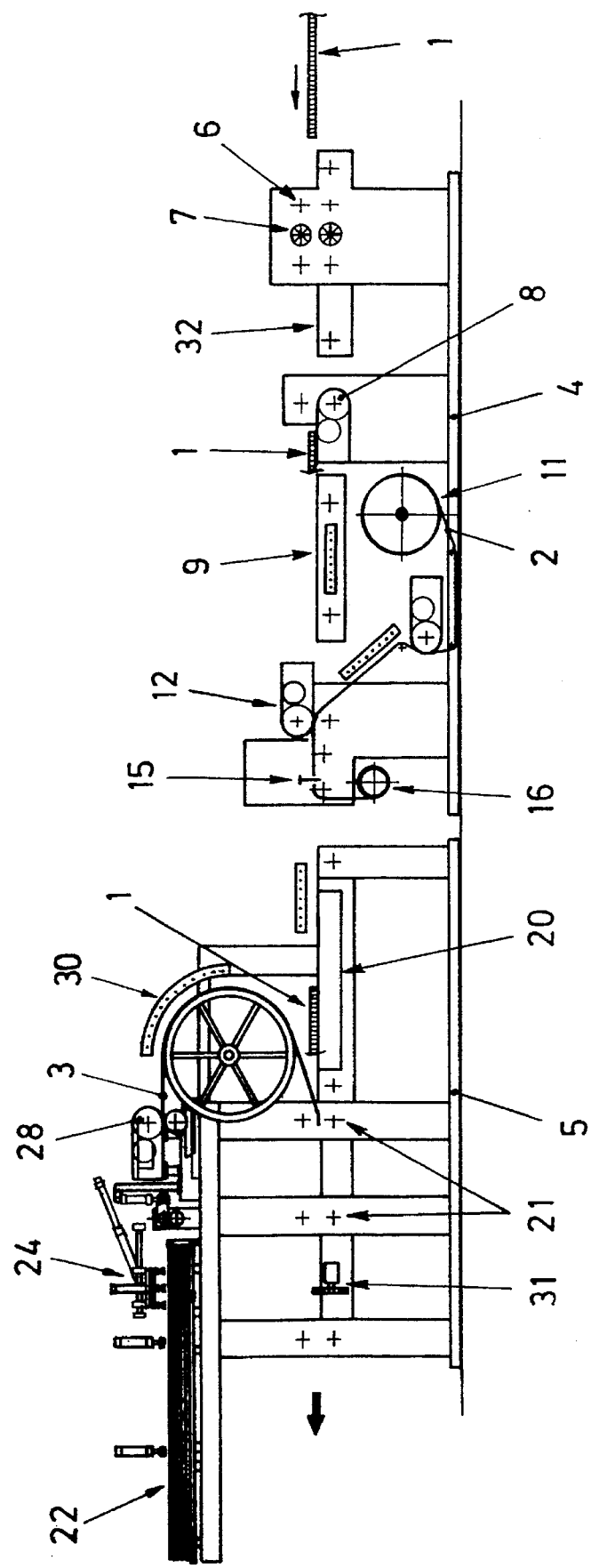
FIG. 1 shows an overall schematic of the total machine which is the object of this invention.

The object of the invention is a machine for laminating panels (1), such as those used in the manufacture of furniture and decor, with decorative veneer (2) and (3) which determine the desired exterior appearance. The purpose of this machine is to carry out the corresponding operations in a continuous process and in a totally automated manner.

The machine, which is the object of this invention, consists entirely of two modules (4) and (5) arranged consecutively, the first of which is set up to apply veneer (2) destined for the lower surface of the panels (1), while the second module (5) is set up to apply veneer (3) destined to cover the upper surface of the same panels (1).

At the entrance to the first module (4), into which the panels (1) are inserted manually or by automatic feeding, there is a set of transport and pressure rollers (6). Between them are brushes (7) which clean the surfaces of the panels (1) to be laminated.

Among the mechanisms of the module (4) there is an adhesive applicator head (8) placed in a correlative position, which impregnates the lower surface of the panels (1) with adhesive as they advance. Next, there is a set (9) of infrared heaters which reactivate the applied adhesive in order to optimize its adherence properties.

Figure 2:
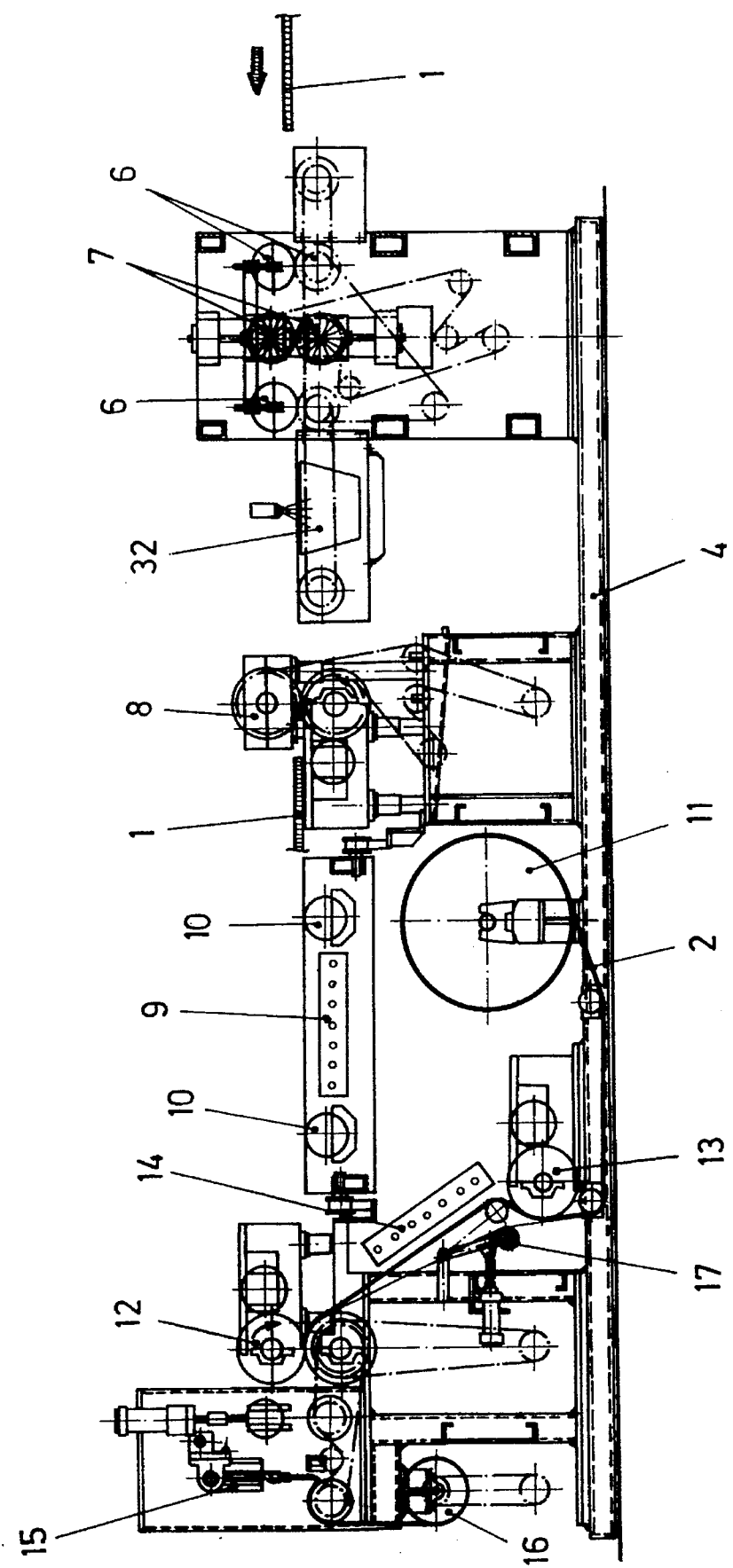
FIG. 2 is an enlarged and more detailed representation of the machine module designed to fix the lower lamination veneer to the bottom of the panels to be laminated.

The heating block (9) is placed between transporter disks (10), see FIG. 2; these disks (10) have a streamlined contour for minimal contact with the gummed surface of the panels (1).

Underneath the track is an unwinding device (11) within which there is a spool of veneer (2) for laminating the lower surface of the panels (1). This veneer (2) is of a thinner gauge since it is for the side that will normally remain hidden.

A second adhesive applicator head (12) is placed in a correlative position with respect to set of heaters (9), which impregnates the upper surface of the panels (1) with adhesive as they pass.

As for veneer (2), it is transported from the unwinding device (11) to the area where the panels (1) pass. Veneer (2) passes adhesive applicator head (13), which impregnates the surface, which will come into contact with the panels (1) during application with adhesive. The track of this veneer (2) moreover passes a set (14) of infrared lamps which reactivate the applied adhesive in order to optimize its adherence.

As they pass beneath the applicator head (12) rollers, the panels (1) coincide with the veneer (2), producing a continuous joining of the two. Beneath the track there is a cutting mechanism (15) which transversely cuts off the initial excess veneer (2) and pulls it into a winder (16).

Thus, the panels (1) exit the module (4) with veneer (2) applied to the lower surface and adhesive to the upper surface. They are introduced immediately into the second module (5). At the entrance they pass underneath a set (18) of infrared lamps which reactivate the adhesive deposited on the upper side.

Figure 3:
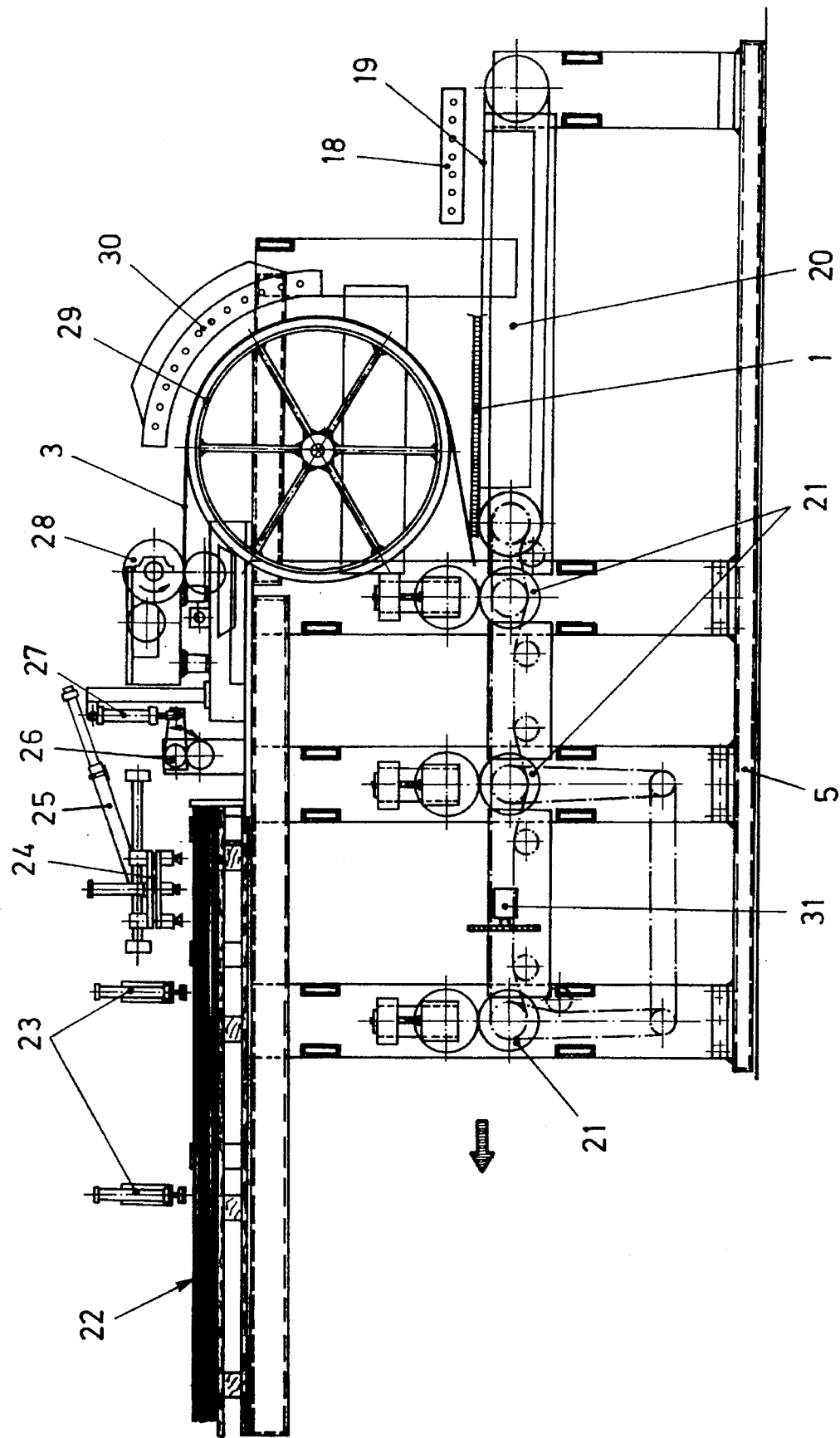
FIG. 3 is an enlarged and more detailed representation of the machine module designed to fix the upper lamination veneer to the top of the panels to be laminated.

Upon entry into the module (5), shown in FIG. 3, the panels (1) are placed on perforated belts (19) that run over suction compartments (20) which hold the entering panels (1) in place.

Following the aforementioned belts (19), there is a series of successive pressure rollers (21) between which the panels (1) must pass.

On the upper side there is a storage bin (22) where the sheets of veneer (3) for the upper side of the panels (1) are stored in a pile. These sheets of veneer (3), because they will be applied to the visible surface, are thicker than veneer (2) (particularly in the case of high-pressure veneers).

Centering guides (23), placed correlative with respect to the above storage bin (22), place the sheets of veneer (3) in the correct position. Above the pile of sheets of veneer (3) there is a feeder (24) composed of supports with suction cups which can be separated on a guide (25) to facilitate the loading of the sheets of veneer (3).

The feeder (24) picks up the sheets of veneer (3) and takes them to the entrance of a set of motorized rollers (26). These rollers (26) are brought together by the action of a cylinder (27), in order to trap and propel the sheet of veneer (3)

between them. This allows the beginning of the propulsion to occur at the precise moment.

After the above propelling rollers (26), there is an adhesive applicator head (28) which impregnates the sheets of veneer (3) with adhesive on the side that will come into contact with the panels (1). Following the applicator head (28) there are two reversing wheels (29) equipped with suction cups around their periphery. The sheets of veneer (3) become fixed to the periphery of the wheels (29) after passing the above adhesive applicator head (28).

These wheels (29), which have suction cups only around half their circumference, that is, around 180°, transport the sheets of veneer (3) to the point of insertion between the pressure rollers (21). As they are being held during transport, the sheets of veneer (3) pass by a set (30) of infrared lamps which reactivate the adhesive applied by the adhesive applicator head (28) to optimize its adherence properties.

The controlled engagement of the propelling rollers (26), by means of the cylinder (27), allows the synchronization of the movement of the sheets of veneer (3) with that of the application panels (1), so that the arrival of both at the entry between the pressure rollers (21) will occur simultaneously. In this manner, the fit of the sheets of veneer (3) with the respective panels (1) is perfect. Both pieces pass in a juxtaposed manner between the rollers mentioned (21) which, by means of pressure, assure an effective adhesion.

Between the last two groups of pressure rollers (21), a cutting device (31) has been incorporated which carries out the elimination of the lower veneer (2) past the ends of the panels (1), so that the latter turn out adequately finished on the ends, ready to be inserted afterwards into another machine for shaping the lateral excess materials or for finishing the edges.

Projection adhesive applicators (32) have been placed after the brushes (7) to additionally provide impregnation of the lateral edges of the panels (1) with the necessary adhesive, as well as for the impregnation of beveled areas or any other shaped parts that may be provided on the edges of the panels (1). These applicators carry out the impregnation of these edge areas of the panels (1) that do not coincide with the planes to be handled by adhesive applicator heads (8) and (12) that impregnate the upper and lower surfaces.

I claim:

1. A continuous lamination machine for applying veneer to a panel, comprising:

a first module including means for applying veneer on a lower surface of a panel, said first module further including an unwinding means for providing continuous veneer from a spool; and a second module arranged consecutively with said first module, said second module including means for applying veneer on an upper surface of said panel by applying veneer in cut sheets to said upper surface of said panel.

2. A continuous lamination machine for veneered panels in accordance with claim 1, further including in said first module a first roller adhesive applicator means for impregnating the lower surface of said panel with adhesive for the fixing of veneer on the lower surface of said panel and a second roller adhesive applicator means to impregnate the upper surface of said panel with adhesive for fixing of veneer on the upper surface of said panel.

3. A continuous lamination machine for veneered panels in accordance with claim 1, further including a first adhesive applicator means for applying adhesive to a surface of said continuous veneer and a second adhesive applicator means for applying adhesive to a surface of said cut sheets of veneer.

4. A continuous lamination machine for veneered panels in accordance with claim 1, further including:

a set of adhesive applicator means for applying adhesive on the upper and lower surfaces of said panels respectively, a pair of applicator heads for applying adhesive on a surface of said continuous veneer to be adhered to said lower surface of said panel and for applying adhesive on a surface of said veneered sheets to be adhered to said upper surface of said panel, heater means for activating said adhesive after it has been applied to said panel and said veneers, and pressure rollers through which said panel passes after said continuous veneer and said veneer sheets have been adhered thereto.

5. A continuous lamination machine for veneered panels in accordance with claim 1, further including brushes at the beginning of said first module for cleaning large surfaces of said panel, and projection adhesive applicator means for applying adhesive to the edges of the panel.

6. A continuous lamination machine for veneered panels in accordance with claim 4, wherein said heater means includes a plurality of infrared lamps, with at least one of said infrared lamps being placed immediately after each adhesive applicator means and adhesive applicator heads.

7. A continuous lamination machine for veneered panels in accordance with claim 1, further including in said first module, a cutting means for cutting off excess veneer, and including in said second module a second cutting means for cutting off excess veneer.

8. A continuous lamination machine for veneered panels in accordance with claim 1, wherein said second module further includes a feed roll means for feeding said cut sheets of veneer in a synchronized manner with the movement of said panel.

9. A continuous lamination machine for veneered panels in accordance with claim 1, wherein said second module includes a bin in which are stacked said sheets of veneers with the decorative surfaces of said sheets of veneers facing down, and a means for applying adhesive to a non-decorative side of said sheets of veneers.

10. A continuous lamination machine for veneered panels in accordance with claim 1, wherein said second module further includes:

adhesive applying means for applying adhesive to a non-decorative side of said sheets of veneer, a set of wheels with suction cups around their peripheries for receiving said sheets of veneer, transporting them past said adhesive applicator means, and applying them to said panel with the adhesive applied side towards the panel.

* * * * *